United States Patent
Iijima (10) Patent No.: US 11,485,609 B2
(45) Date of Patent: Nov. 1, 2022

(54) MAGNETIC BODY INSPECTION DEVICE

(71) Applicant: Shimadzu Corporation, Kyoto (JP)

(72) Inventor: Kenji Iijima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 2 days.

(21) Appl. No.: 16/970,578

(22) PCT Filed: Nov. 22, 2018

(86) PCT No.: PCT/JP2018/043144
§ 371 (c)(1),
(2) Date: Aug. 17, 2020

(87) PCT Pub. No.: WO2019/171667
PCT Pub. Date: Sep. 12, 2019

(65) Prior Publication Data
US 2021/0107770 A1    Apr. 15, 2021

(30) Foreign Application Priority Data

Mar. 8, 2018   (JP) .............................. JP2018-042069

(51) Int. Cl.
*B66B 5/12*     (2006.01)
*G01N 27/83*    (2006.01)

(52) U.S. Cl.
CPC ............... *B66B 5/12* (2013.01); *G01N 27/83* (2013.01)

(58) Field of Classification Search
None
See application file for complete search history.

(56) References Cited

U.S. PATENT DOCUMENTS

| | | | |
|---|---|---|---|
| 3,483,466 A * | 12/1969 | Beaver ................. | G01N 27/904 324/220 |
| 4,555,665 A | 11/1985 | Stanley et al. | |
| 4,611,170 A | 9/1986 | Stanley et al. | |
| 4,792,756 A * | 12/1988 | Lam ..................... | G01N 27/904 324/226 |

(Continued)

FOREIGN PATENT DOCUMENTS

| | | |
|---|---|---|
| JP | S55-103458 A | 8/1980 |
| JP | S59-058303 A | 4/1984 |

(Continued)

OTHER PUBLICATIONS

Stanley, Roderic (Simple explanation of the theory of the total magnetic flux method for the measurement of ferromagnetic cross sections. United States: N. p., 1995. Web.) (Year: 1995).*

(Continued)

*Primary Examiner* — Raul J Rios Russo
*Assistant Examiner* — Carl F. R. Tchatchouang
(74) *Attorney, Agent, or Firm* — Muir Patent Law, PLLC (57) ABSTRACT

A magnetic body inspection device (100) is a magnetic body inspection device for inspecting states of a plurality of magnetic bodies (W) by a total magnetic flux method that measures a magnetic flux inside the magnetic body (W). The device includes a plurality of detection coils (10) each for detecting the magnetic field of each of the magnetic bodies (W), an excitation unit (11) provided for the plurality of magnetic bodies (W), and a detection signal output unit (12) for outputting a detection signal based on the magnetic field of each of the magnetic bodies (W).

7 Claims, 7 Drawing Sheets

(56) References Cited

U.S. PATENT DOCUMENTS

| | | | | |
|---|---|---|---|---|
| 4,818,935 A * | 4/1989 | Takahashi | ............ | G01N 27/9013 |
| | | | | 324/242 |
| 5,235,275 A * | 8/1993 | Ando | ................. | G01N 27/9046 |
| | | | | 324/261 |
| 2007/0222436 A1* | 9/2007 | Gao | ........................ | G01N 27/82 |
| | | | | 324/220 |
| 2013/0147471 A1* | 6/2013 | Weischedel | ............ | G01N 27/83 |
| | | | | 324/238 |
| 2017/0038338 A1* | 2/2017 | Kondoh | ................. | G01N 27/83 |

FOREIGN PATENT DOCUMENTS

| | | |
|---|---|---|
| JP | 2005-089172 A | 4/2005 |
| JP | 2009-091127 A | 4/2009 |
| WO | 2015/166533 A1 | 11/2015 |

OTHER PUBLICATIONS

Extended European Search Report (EESR) dated Oct. 19, 2021 in the corresponding European patent application No. 18 909 125.9.
Written Opinion by the International Search Authority for PCT application No. PCT/JP2018/043144, dated Feb. 12, 2019, submitted with a machine translation.

* cited by examiner

First Embodiment

FIG. 1

First Embodiment

FIG. 2

First Embodiment

FIG. 3

First Embodiment

First Embodiment

FIG. 6

First Embodiment

FIG. 7

Second Embodiment

FIG. 8

First Modification of First Embodiment

FIG. 9

Second Modification of First Embodiment

FIG. 10

Second Modification of First Embodiment

FIG. 11

Third Modification of First Embodiment

FIG. 12

MAGNETIC BODY INSPECTION DEVICE

TECHNICAL FIELD

The present invention relates to a magnetic body inspection device, and more particularly to a magnetic body inspection device for inspecting states of a plurality of magnetic bodies.

BACKGROUND OF THE INVENTION

Conventionally, a magnetic body inspection device for inspecting states of a plurality of magnetic bodies is known. Such a magnetic body inspection device is disclosed in, for example, Japanese Unexamined Patent Application Publication No. 2005-89172.

Japanese Unexamined Patent Application Publication No. 2005-89172 discloses a magnetic body inspection device provided with a plurality of guide paths for guiding respective wire ropes and a magnetization detector equipped with an excitation unit including a permanent magnet and a detection coil below each guide path. The magnetic body inspection device disclosed in Japanese Unexamined Patent Application Publication No. 2005-89172 has a configuration in which a wire rope is magnetized by the permanent magnet and the state of the wire rope is inspected by a leakage magnetic flux method in which the magnetic field leaking from the wire rope is detected by the detection coil. The detection coil disclosed in Japanese Unexamined Patent Application Publication No. 2005-89172 is formed in a concave curved surface shape conforming to the shape of the guide path.

PRIOR ART DOCUMENT

Patent Document

Patent Document 1: Japanese Unexamined Patent Application Publication No. 2005-89172

SUMMARY OF THE INVENTION

Problems to be Solved by the Invention

However, since the leakage magnetic flux method performed by the magnetic body inspection device disclosed in Japanese Unexamined Patent Application Publication No. 2005-89172 detects the magnetic field leaking from the surface of the magnetized wire rope by the detection coil, it is difficult to accurately detect the damage occurred inside the wire rope or the damage occurred at a portion of the wire rope not facing the detection coil. For this reason, it is difficult to accurately inspect a plurality of wire ropes. Further, the magnetic body inspection device disclosed in Japanese Unexamined Patent Application Publication No. 2005-89172 has a configuration in which a permanent magnet is provided for each guide path, and therefore, the number of components increases.

The present invention has been made to solve the above-mentioned problems, and an object of the present invention is to provide a magnetic body inspection device capable of accuracy inspecting states (presence or absence of damage or the like) of a plurality of magnetic bodies while suppressing an increase in the number of components.

Means for Solving the Problem

In order to attain the above-described object, a magnetic body inspection device according to one aspect of the present invention is a magnetic body inspection device for inspecting states of a plurality of magnetic bodies by a total magnetic flux method for measuring a magnetic flux inside a magnetic body, and the device is provided with a plurality of detection coils each configured to detect a magnetic field of each of the plurality of magnetic bodies, one excitation unit provided for the plurality of magnetic bodies, and a detection signal output unit configured to output a detection signal based on the magnetic field of each of the plurality of magnetic bodies.

Note that in the present invention, the term "damage or the like" of a magnetic body is a broad concept including a change in cross-sectional area of a magnetic body with respect to the inspection direction due to sagging, local wearing, element wire breakage, recesses, corrosion, cracking, bending, or the like (including those caused by voids when damage or the like is generated inside the magnetic body), a change in magnetic permeability of a magnetic body caused by rust, weld burn, contamination of impurities, compositional change, and the like, and a non-uniform portion of a magnetic body. Further note that a change in the magnetic field is a broad concept including a temporal change in the intensity of the magnetic field detected by the detection unit due to a relative movement of a magnetic body and a detection unit and a temporal change in the intensity of the magnetic field detected by a detection unit due to a temporally change in the magnetic field applied to a magnetic body.

As described above, the magnetic body inspection device according to one aspect of the present inventions is provided with the plurality of detection coils for detecting the magnetic field of each of the plurality of magnetic bodies and one excitation unit provided for the plurality of magnetic bodies. Note that in an inspection of a magnetic body by a total magnetic flux method, the inspection is performed by measuring the magnetic flux (total magnetic flux) inside the magnetic body. Therefore, even if damage or the like is located at any position of the magnetic body, the damage can be detected based on the change in the magnetic flux inside the magnetic body. By configuring as described above, the magnetic field generated from each magnetic body can be detected by the plurality of detection coils each for detecting the magnetic field of each magnetic body. As a result, the states (presence or absence of the damage or the like) of the plurality of magnetic bodies can be inspected by the total magnetic flux method, so that the states (presence or absence of the damage or the like) of the plurality of magnetic bodies can be inspected more accurately as compared with the case in which states (presence or absence of damage or the like) of a plurality of magnetic bodies are inspected using a leakage magnetic flux method for measuring magnetic flux leaking from a surface of a magnetic body. Further, since a magnetic field can be applied to the plurality of magnetic bodies at a time by the one excitation unit, it is possible to suppress an increase in the number of components as compared with a case where one excitation unit is provided for one detection coil (magnetic body). Therefore, it is possible to accurately inspect the states (presence or absence of damage or the like) of the plurality of magnetic bodies while suppressing an increase in the number of components.

In the magnetic body inspection device according to the above-described one aspect of the present invention, preferably, the plurality of detection coils is each provided so as to surround a periphery of each of the plurality of magnetic bodies, and the one excitation unit is provided for the plurality of magnetic bodies. With this configuration, it is possible to apply a magnetic field to the plurality of magnetic bodies each surrounded by the detection coil by the one excitation unit. As a result, in the magnetic body inspection device, since each detection coil can be arranged in each of regions through which the magnetic bodies pass in the magnetic body inspection apparatus, it is possible to suppress an increase in size of the device as compared with a configuration in which each detection coil does not surround the periphery of the magnetic body.

In the magnetic body inspection device according to the above-described one aspect of the present invention, preferably, the excitation unit is configured so as to surround the plurality of detection coils. With this configuration, the plurality of detection coils can be easily arranged inside the excitation unit. As a result, a magnetic field can be easily and reliably applied to the magnetic bodies surrounded by the plurality of detection coils by the magnetic field generated inside the excitation unit.

In this case, preferably, the detection coil includes a pair of differential coils, and the excitation unit is configured so as to surround a plurality of sets of the differential coils. With this configuration, even in cases where a plurality of sets of differential coils is used, a magnetic field can be applied by one excitation unit. As a result, since it is possible to apply a magnetic field to the differential coils capable of suppressing the effect of the external magnetic field at a time by one excitation unit, it is possible to improve the accuracy of the inspection of the states (presence or absence of damage or the like) of the magnetic bodies, which can simplify the configuration of the device.

In the magnetic body inspection device according to the above-described one aspect of the present invention, preferably, the magnetic body is a long size member and the plurality of detection coils is arranged such that positions of at least the detection coils arranged adjacently are shifted from each other in a direction in which the plurality of long size members extends, and the excitation unit is configured so as to surround the plurality of detection coils arranged to be shifted from each other. With this configuration, even in cases where the intervals of the plurality of long size members are small, by arranging the plurality of detection coils arranged to be shifted from each other in the direction in which the plurality of long size members extends, it is possible to arrange the detection coils so as to overlap each other in the direction in which the long size members extend. As a result, as compared with the case in which the plurality of detection coils are not arranged to be shifted from each other in the direction in which the long size members extend, even in cases where the intervals between the plurality of long size members are small, the inspection can be performed using the magnetic body inspection device, so that the range in which the magnetic body inspection device can be applied can be extended.

In the magnetic body inspection device according to the above-described one aspect of the present invention, preferably, the device further includes a magnetic field application unit configured to apply a magnetic field to the magnetic body so that the magnetic field is applied to the magnetic body in a predetermined direction, wherein the plurality of detection coils is configured to detect a change in the magnetic field of the magnetic body to which the magnetic field has been previously applied by the magnetic field application unit. With this configuration, since a magnetic field is applied to the magnetic body in advance, the direction of the magnetization of the magnetic body can be made substantially constant. As a result, noises of the detection signal output from the detection signal output unit can be reduced, and the S/N ratio of the detection signal can be improved. Therefore, by improving the S/N ratio of the detection signal, it is possible to more accurately inspect the states (presence or absence of damage or the like) of the plurality of magnetic bodies.

In the magnetic body inspection device according to the above-described one aspect of the present invention, preferably, the device further includes a determination unit configured to determine a status of each of the plurality of magnetic bodies based on a plurality of the detection signals output by the detection signal output unit, and the determination unit is configured to output a threshold signal indicating that each of the detection signals has exceeded a predetermined threshold for each magnetic body when each of the detection signals output by the detection signal output unit has exceeded the predetermined threshold. With this configuration, by confirming the output threshold signal, it is possible to easily determine the portion (position) where damage or the like occurred in the magnetic body.

In the magnetic body inspection device according to the above-described one aspect of the present invention, preferably, the excitation unit includes an excitation coil arranged so as to wind around the plurality of detection coils, the excitation coil is configured to apply a magnetic field in a direction in which the magnetic body extends, and each of the plurality of detection coils is configured to detect a change in the magnetic field of each of the magnetic bodies caused by an application of the magnetic field by the excitation coil. With this configuration, since the magnetization state of the portion of damage or the like of the magnetic body is excited by the excitation coil, the change of the magnetic field can be easily detected from the portion of the damage or the like of the magnetic body. In particular, when an alternating current or the like is caused to flow through the excitation coil, the magnetic field of the magnetic body also changes with time. Therefore, the magnetic field detected by the detection coil can be changed and detected without relatively moving the magnetic body and the detection coil.

Effects of the Invention

According to the present invention, as described above, it is possible to provide a magnetic body inspection device capable of accuracy inspecting the states (presence or absence of damage or the like) of the plurality of magnetic bodies while suppressing an increase in the number of components.

EMBODIMENTS FOR CARRYING OUT THE INVENTION

Hereinafter, some embodiments in which the present invention is embodied will be described with reference to the attached drawings.

First Embodiment

First, referring to FIG. 1 to FIG. 7, the configuration of the magnetic body inspection device 100 according to a first embodiment will be described. An example will be described in which the magnetic body inspection device 100 inspects a steel wire rope W used to move a car 401 of an elevator 400.

Figure 1:
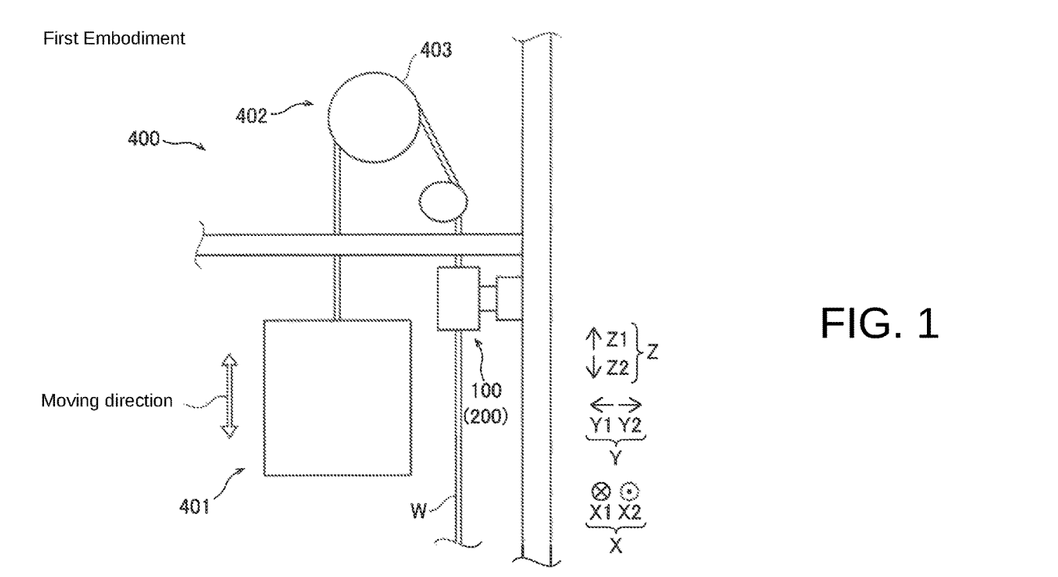
FIG. 1 is a schematic diagram showing an example of an inspection of a steel wire rope using a magnetic body inspection device according to a first embodiment.

In the first embodiment, as shown in FIG. 1, in the elevator 400 in which the car 401 is moved in the up-and-down direction (Z-direction) by winding the steel wire rope W by the winding machine 402, the magnetic body inspection device 100 is configured to inspect the state (presence or absence of damage or the like) of the steel wire rope W. As shown in FIG. 1, the magnetic body inspection device 100 is configured to inspect the state (presence or absence of damage or the like) of the steel wire rope W at a location where the steel wire rope W to be inspected is installed. Specifically, the magnetic body inspection device 100 is configured to inspect the states (presence or absence of damage or the like) of the plurality of steel wire ropes W by a total magnetic flux method for measuring the magnetic flux inside the steel wire rope W. Note that although only one steel wire rope W is shown in the example shown in FIG. 1 for convenience, the elevator 400 is provided with a plurality of steel wire ropes W. Note that the X- and Y-directions are two directions perpendicular in a plane perpendicular to the extension direction of the steel wire rope W. Also note that the steel wire rope W is an example of the "magnetic body" and the "long size member" recited in claims. The Z-direction is an example of the "direction in which a long size member extends" recited in claims.

The steel wire rope W is a magnetic body of a long size member that extends in the Z-direction and is formed by braiding (e.g., strand-braiding) magnetic strand materials. When the car 401 is moved, the steel wire rope W passes through the winding machine 402 and is stressed by the pulley 403 or the like. In the steel wire rope W, stresses cause deterioration, such as, e.g., disconnection of element wires. The magnetic body inspection device 100 can detect the progress of deterioration of the steel wire rope W at an early stage by periodically inspecting the steel wire rope W. Therefore, when the deterioration of the steel wire rope W has progressed and the replacement is required, the steel wire rope W can be replaced at an early stage.

(Configuration of Magnetic Body Inspection Device)

Next, referring to FIG. 2 to FIG. 5, the configuration of the magnetic body inspection device 100 according to the first embodiment will be described.

Figure 2:
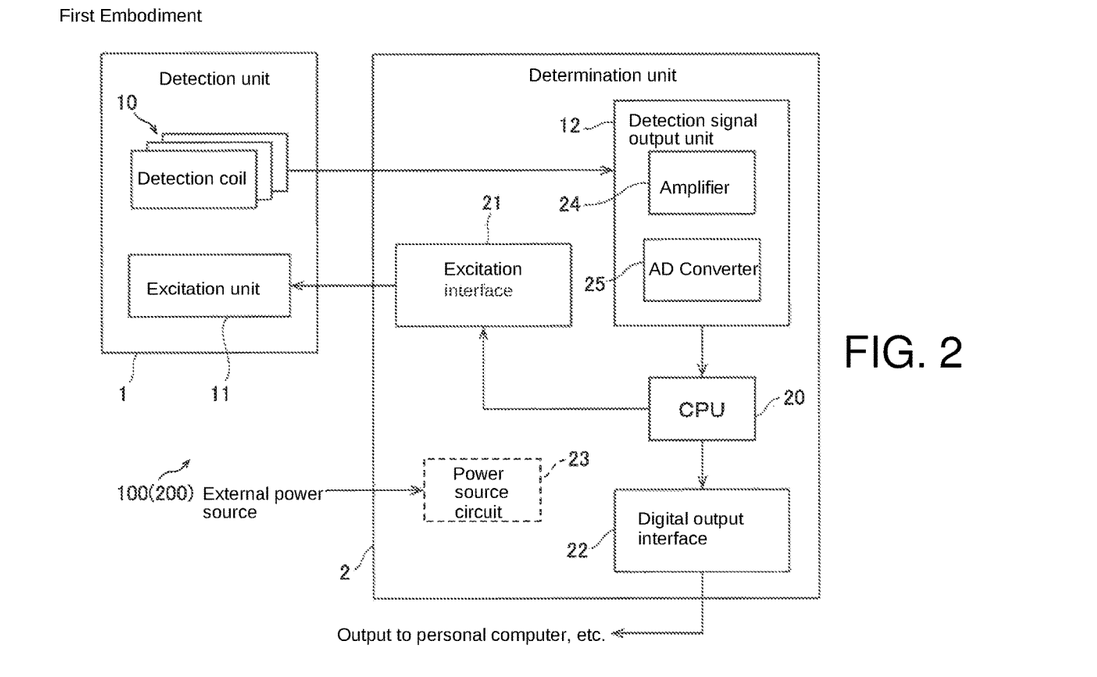
FIG. 2 is a block diagram showing an entire configuration of the magnetic body inspection device according to the first embodiment.

As shown in FIG. 2, the magnetic body inspection device 100 is provided with a detection unit 1 and a determination unit 2. The detection unit 1 is provided with a plurality of detection coils 10 and an excitation unit 11.

Each detection coil 10 is configured to detect the magnetic field of each steel wire rope W. The excitation unit 11 is configured to apply a magnetic field to each of the plurality of steel wire ropes W. The excitation unit 11 includes an excitation coil 13 (see FIG. 3).

The determination unit 2 includes a detection signal output unit 12, a CPU (Central Processing Unit) 20, an excitation interface 21, a digital output interface 22, and a power supply circuit 23. The determination unit 2 is configured to determine the status of each of the steel wire ropes W based on the plurality of detection signals output by the detection signal output unit 12.

The detection signal output unit 12 is configured to respectively output the detection signal based on each magnetic field of the steel wire rope W detected by the detection coil 10. Specifically, the detection signal output unit 12 includes an amplifier 24 and an AD converter 25. The amplifier 24 amplifies the current based on the strength of the magnetic field of the steel wire rope W detected by the detection coil 10 and outputs the amplified current to the AD converter 25. The AD converter 25 converts the analog detection signal amplified by the amplifier 24 into a digital detection signal and outputs the digital detection signal to the CPU 20.

The CPU 20 performs processing for removing AC components from the detection signal output from the detection signal output unit 12. Further, the CPU 20 performs synchronous detection rectifier processing for converting the detection signal into a signal (DC-level signal) corresponding to the change in the absolute value of the detection signal. In addition, the CPU 20 outputs a warning signal when the detection signal has exceeded a predetermined threshold Th, which will be described later. The excitation interface 21 causes an alternating current to flow (output) to the excitation unit 11 (excitation coil 13). Further, the CPU 20 controls the intensity of the current output by the excitation interface 21. The CPU 20 determines the size of the damage or the like of the steel wire rope W.

The digital output interface 22 is connected to an external PC (not shown) or the like and outputs digital data of the processed detection signal and warning signal. The external PC stores the magnitude of the input signal in a memory and performs a display of a graph with the lapse of time of the magnitude of the signal. The power supply circuit 23 is connected to an external power source and is configured as a power source for supplying power to each part of the magnetic body inspection device 100.

Further, the CPU 20 is configured so that when the detection signal output by the detection signal output unit 12 has exceeded a first threshold Th1, a first threshold signal indicating that the detection signal has exceeded the first threshold Th1 is output to the outside, and when the detection signal output by the detection unit 1 has exceeded a second threshold Th2, a second threshold signal indicating that the detection signal has exceeded the second threshold Th2 is output to the outside. Note that the first threshold Th1 and the second threshold Th2 are examples of the "predetermined threshold" recited in claims, respectively.

Figure 3:
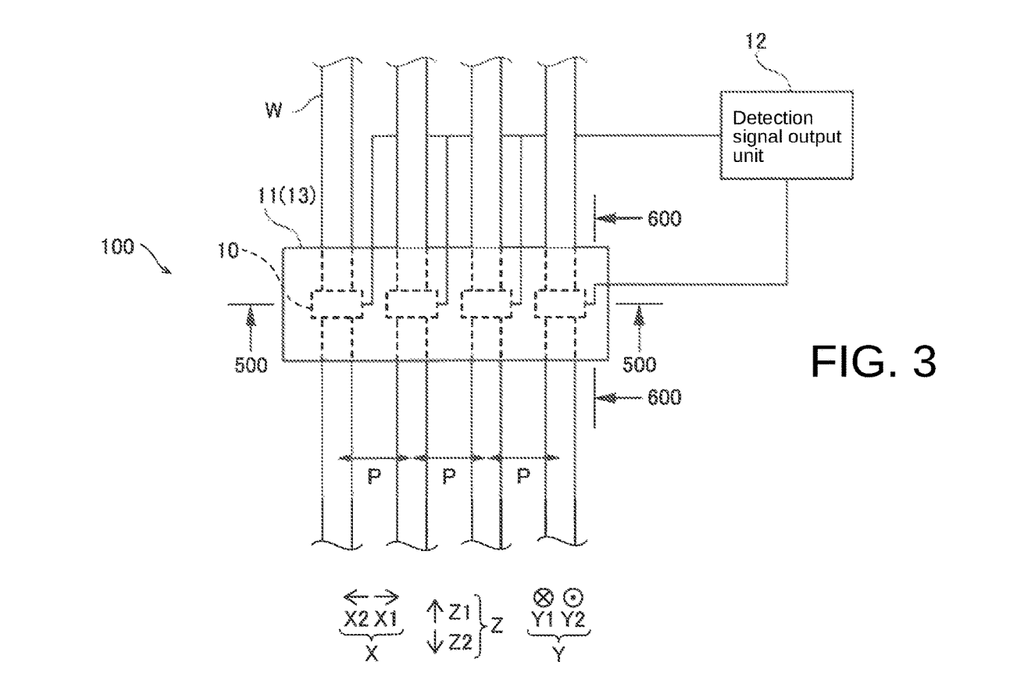
FIG. 3 is a schematic view of the magnetic body inspection device according to the first embodiment as viewed from the Y-direction.

As shown in FIG. 3, the elevator 400 (see FIG. 1) has a plurality of steel wire ropes W. Specifically, the elevator 400 has four steel wire ropes W arranged in the X-direction. The steel wire ropes W are arranged in the X-direction at intervals P. The detection coil 10 is provided around each of the plurality of steel wire ropes W and is configured to detect the magnetic field of each steel wire rope W. In the first embodiment, the detection unit 1 is provided with four detection coils 10. Further, one excitation unit 11 (excitation coil 13) is provided for a plurality of steel wire ropes W. The detection signal output unit 12 is configured to output detection signals based on the respective magnetic fields of the steel wire ropes W.

Figure 4:
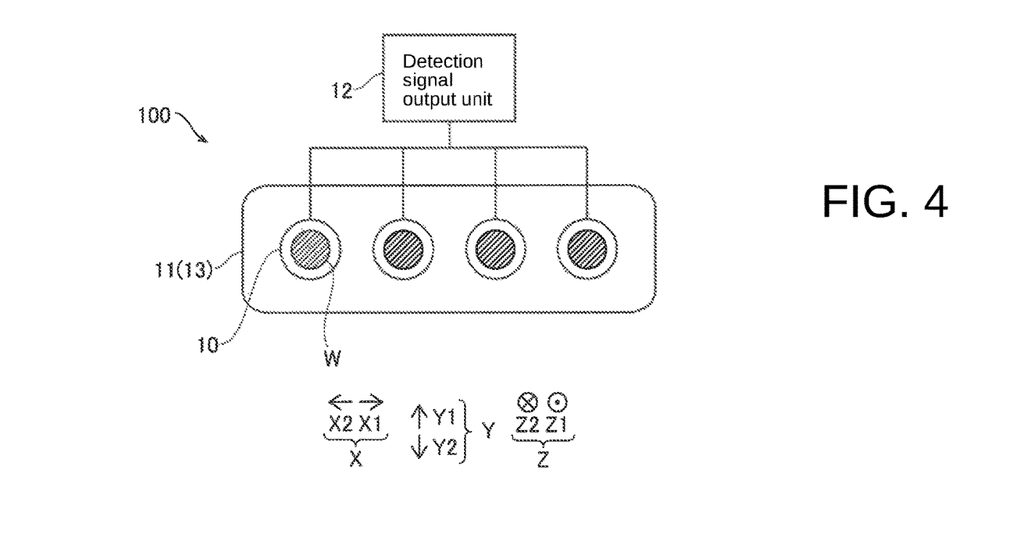
FIG. 4 is a schematic plan view of the magnetic body inspection device according to the first embodiment taken along the line 500-500 in FIG. 3.

As shown in FIG. 4, each of the plurality of detection coils 10 is provided so as to surround the periphery of the corresponding steel wire rope W, and one excitation unit 11 (excitation coil 13) is provided for the plurality of steel wire ropes W. Specifically, the detection coil 10 is a coil in which a conducting wire is wound a plurality of times in a direction (Z-direction) in which the steel wire rope W extends around the steel wire rope W. The excitation unit 11 (excitation coil 13) is configured to surround the plurality of detection coils 10. Specifically, the excitation unit 11 (excitation coil 13) is wound so as to surround the plurality of detection coils 10. The excitation coil 13 is configured to apply a magnetic field in a direction (Z-direction) in which the steel wire rope W extends. In the first embodiment, the excitation unit 11 (excitation coil 13) surrounds the four detection coils 10. Note that the detection coils 10 and the excitation coil 13 are held by a coil holding portion (not shown). Note that the length r1 of the excitation coil 13 in the Z-direction is larger than a distance (2×r2+r3) obtained by adding the length r2 of the detection coil 10a in the Z-direction, the length r2 of the detection coil 10b in the Z-direction, and the distance r3 between the detection coil 10a and the detection coil 10b. The distance r3 between the detection coil 10a and the detection coil 10b is preferably smaller than the interval P of the steel wire ropes W (see FIG. 3) in order to prevent the magnetic field of the adjacent steel wire ropes W from being detected.

Figure 5:
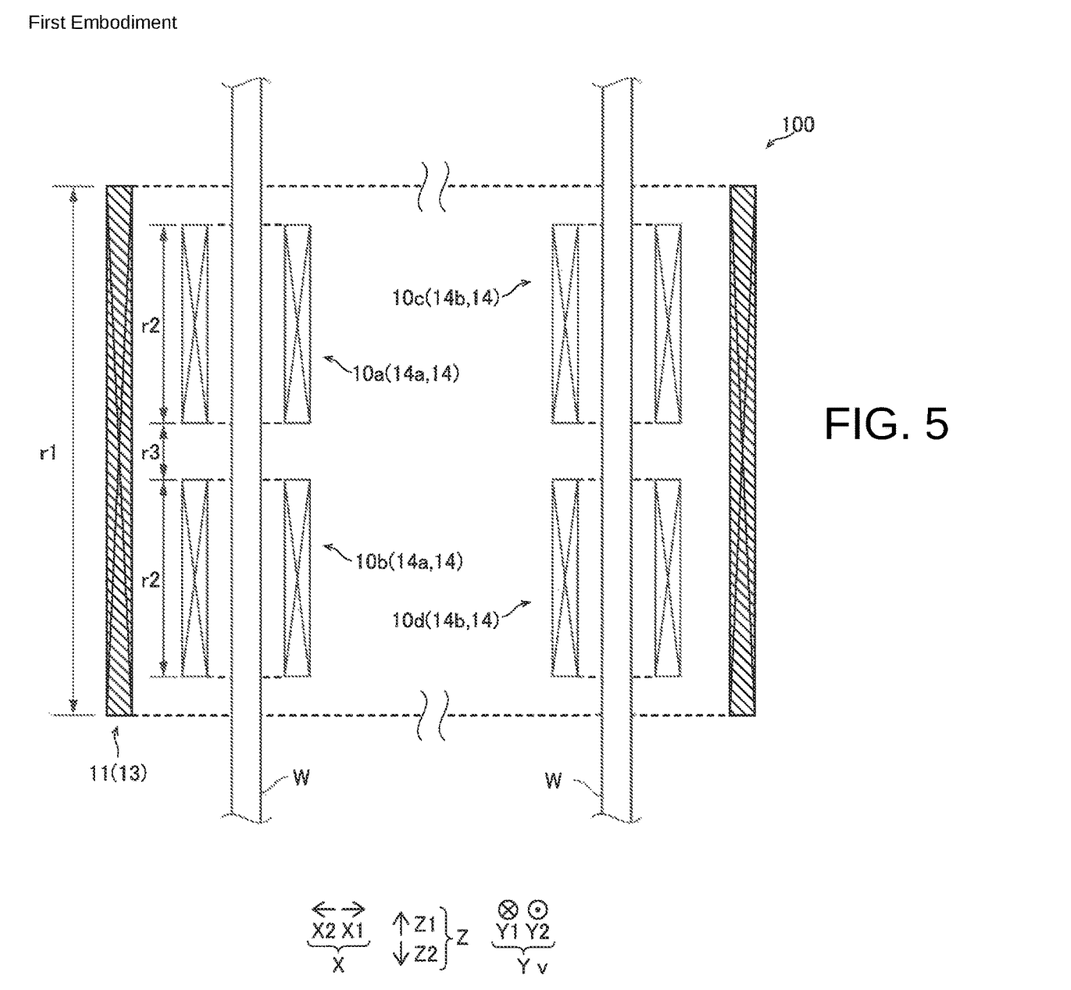
FIG. 5 is a schematic plan view of the magnetic body inspection device according to the first embodiment taken along the line 600-600 in FIG. 3.

As shown in FIG. 5, the detection coil 10 includes a pair of differential coils 14, and the excitation unit 11 (excitation coil 13) is configured to surround a plurality of sets of the differential coils 14 (differential coil 14a and differential coil 14b). In the embodiment shown in FIG. 5, the differential coil 14a is composed of two pieces of the detection coils 10 (detection coil 10a and detection coil 10b). The differential coil 14b is composed of two pieces of detection coils 10 (detection coil 10c and detection coil 10d). In the example shown in FIG. 5, both end steel wire ropes W out of the four steel wire ropes and two differential coils 14 are illustrated for convenience. The remaining two steel wire ropes W which are not illustrated are also surrounded by the respective differential coils 14.

(Configuration for Inspecting Status of Magnetic Body)

Next, referring to FIG. 6 and FIG. 7, a configuration in which the detection unit 1 and the determination unit 2 in the first embodiment inspect the state of the steel wire rope W will be described.

Figure 6:
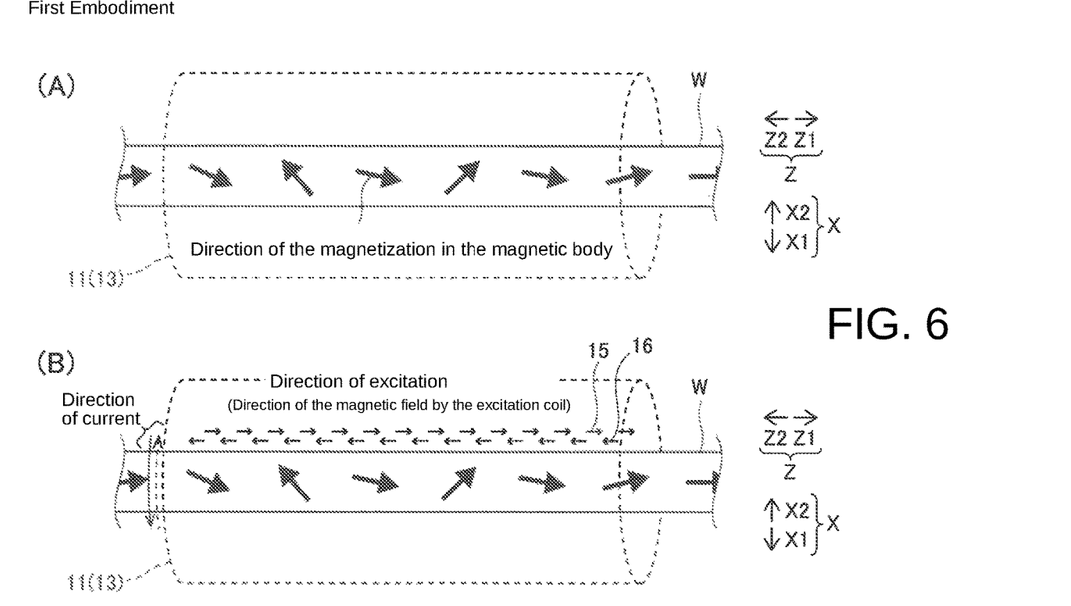
FIG. 6 is schematic diagrams (A) and (B) for explaining the excitation of magnetization of an excitation coil according to the first embodiment.

FIG. 6 (A) is a schematic diagram of a steel wire rope W passing through the inside of the detection unit 1. FIG. 6 (B) is a schematic diagram when exciting the state of the magnetization of the steel wire rope W by applying a magnetic field in the Z-direction by the excitation unit 11 (excitation coil 13 provided in the detection unit 1).

The magnetic body inspection device 100 inspects the state (presence or absence of damage or the like) of the steel wire rope W by a total magnetic flux method. Specifically, each of the plurality of detection coils 10 is configured to detect a change in the magnetic field of each of the steel wire ropes W caused by the application of the magnetic field by the excitation coil 13. As shown in FIG. 6 (A), the excitation unit 11 (excitation coil 13) causes the magnetic field in the steel wire rope W to be saturated. Note that the example shown in FIG. 6 (A) is an example in which the magnetic field inside the steel wire rope W was caused to be saturated in the Z-direction.

In the first embodiment, the excitation unit 11 (excitation coil 13) is configured to cause the magnetic field of the steel wire rope W to be saturated by generating a magnetic field therein by an alternating current (excitation current) from the excitation interface 21. Since the excitation current from the excitation interface 21 is an alternating current, the direction of the magnetic field generated by the excitation unit 11 (excitation coil 13) changes. Specifically, as shown in FIG. 6 (B), when an AC current (excitation current) having a constant magnitude and a constant frequency is caused to flow in the excitation unit 11 (excitation coil 13) from the excitation interface 21, a magnetic field is applied so that the magnetic field oscillates in the direction (Z-direction) in which the steel wire rope W extends (i.e., the magnetic field in the Z1-direction and the magnetic field in the Z2-direction periodically appear). Further, the direction of the magnetic field (see the solid line 15 or the broken line 16) applied by the excitation unit 11 (excitation coil 13) also changes with the direction (see the solid line or the broken line) of the time-varying excitation current flowing in the excitation unit 11 (excitation coil 13).

Therefore, the magnitude (intensity) of the magnetization of the steel wire rope W changes due to the time-varying magnetic field, and the magnetic field emitted from the steel wire rope W also changes with time. As a result, since the magnetic field by the same portion of the steel wire rope W temporally changes without changing the relative position between the steel wire rope W and the detection coil 10, it is possible to determine the state of the steel wire rope W by the detection coil 10 which detects the change in the magnetic field.

Figure 7:
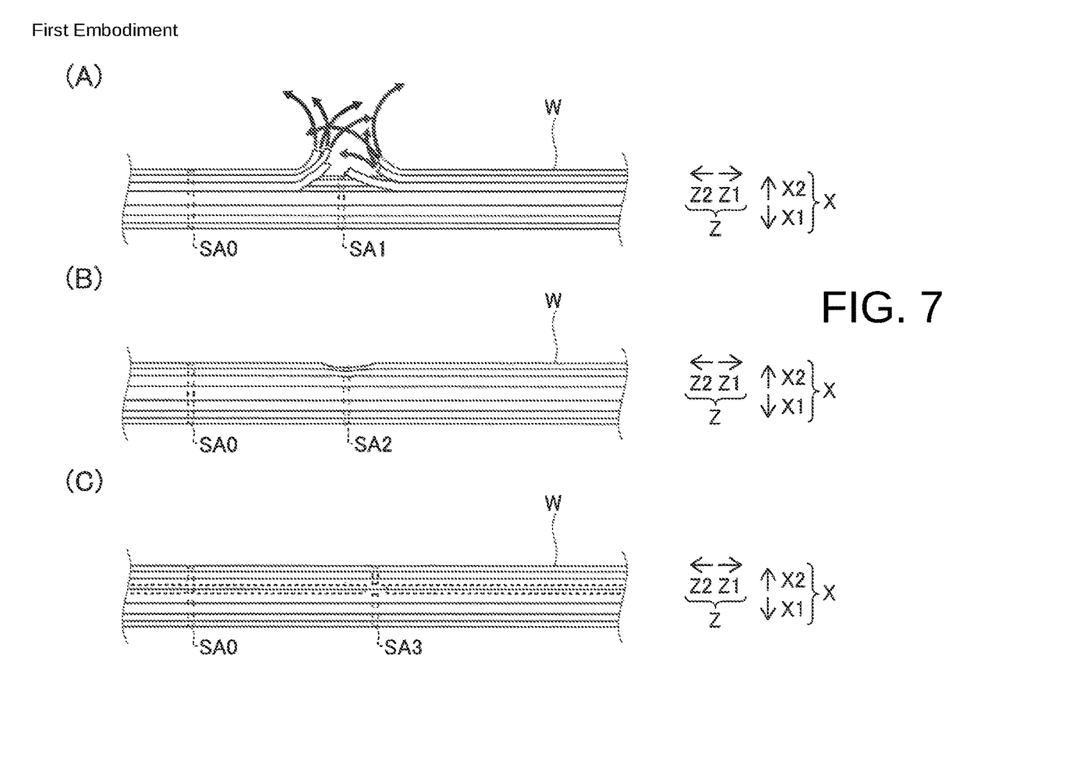
FIG. 7 is schematic diagrams (A), (B), and (C) showing cases where there is damage or the like in a steel wire rope.

FIG. 7 illustrates an example of a steel wire rope W having damage or the like. Note that in FIG. 7, the braiding of element wires is shown in a simplified manner. In the steel wire rope W shown in FIG. 7 (A), the element wires in the front face are broken. Therefore, the magnetic field is leaking from the portion where the breaking of the element wires occurs. In the steel wire rope W shown in FIG. 7 (B), a recess is formed on the front surface portion by rubbing or a dent. Further, in the steel wire rope W shown in FIG. 7 (C), an element wire breakage occurred inside. Since the cross-sectional area SA1, SA2, SA3 of a certain position of the damage or the like is smaller than the cross-sectional area SA0 of a portion without damage or the like, the total magnetic flux (the value obtained by multiplying the permeability and the area to the magnetic field) of the steel wire rope W becomes smaller at a portion where the damage or the like occurred. As described above, in the portion where the damage or the like occurred, the total magnetic flux decreases, which causes the change in the detected magnetic field.

Consequently, for example, since the value of the detected voltage of the detection coil 10a located at the position having the damage or the like is reduced as compared with the detection coil 10b, the value (detection signal) of the difference between the detected voltages by the differential coil 14 (detection coil 10a and detection coil 10b) is increased. That is, since the detection signal at the portion having no damage or the like becomes substantially zero and the detection signal has a value larger than zero at the portion having damage or the like, a clear signal indicating the presence of damage or the like (a signal having a good S/N ratio) is detected by the differential coil 14. Thus, the determination unit 2 can detect the presence of the damage or the like of the steel wire rope W based on the values of the difference between the detection signals. Further, the larger the size of the damage or the like (the size of the reduction amount of the cross-sectional area) is, the larger the value of the detection signal becomes. Therefore, when determining (evaluating) the size of the damage or the like, if there is a large damage or the like to a certain extent or more, it becomes possible to automatically determine that the detection signal has exceeded a predetermined first threshold Th1 or second threshold Th2. Note that the damage or the like includes a change in magnetic permeability due to rust or the like, and similarly appears as a detection signal.

In the first embodiment, since an alternating current is applied from the excitation interface 21 to the excitation unit 11 (excitation coil 13), it is possible to determine the state (presence or absence of damage or the like) of the steel wire rope W arranged in the excitation unit 11 (excitation coil 13) without moving the steel wire rope W and the detection unit 1 relative to each other. Therefore, in the first embodiment, by repeating the moving of the detection unit 1 by the length r1 in the Z-direction of the excitation unit 11 (excitation coil 13) and the determination of the state (presence or absence of the damage or the like) of the steel wire rope W, the state (presence or absence of damage or the like) of the entire steel wire rope W is determined.

Effects of First Embodiment

In this first embodiment, the following effects can be obtained.

In the first embodiment, as described above, the magnetic body inspection device 100 is a magnetic body inspection device for inspecting the states of the plurality of steel wire ropes W by a total magnetic flux method for inspecting the magnetic flux inside the steel wire rope W. The device is provided a plurality of detection coils 10 each for detecting the magnetic field of each steel wire rope W, one excitation unit 11 provided for the plurality of steel wire ropes W, and the detection signal output unit 12 for outputting the detection signal based on each magnetic field of the steel wire rope W. With this, the magnetic field generated from the steel wire rope W can be detected by the plurality of detection coils 10 each for detecting the magnetic field of each steel wire rope W. As a result, the states (presence or absence of damage or the like) of the plurality of steel wire ropes W can be inspected by a total magnetic flux method, so that the states (presence or absence of a damage or the like) of the plurality of steel wire ropes W can be inspected more accurately as compared with the case in which states (presence or absence of a damage or the like) of a plurality of steel wire ropes W are inspected using a leakage magnetic flux method for measuring the magnetic flux leaked from the surface of the steel wire rope W. In addition, since a magnetic field can be applied to the plurality of steel wire ropes W at a time by one excitation unit 11, it is possible to suppress an increase in the number of components as compared with the case in which one excitation unit 11 is provided for one detection coil 10 (i.e., one steel wire rope W). Therefore, it is possible to accurately inspect the states (presence or absence of damage or the like) of the plurality of steel wire ropes W while suppressing an increase in the number of components.

Further, in the first embodiment, as described above, the plurality of detection coils 10 is provided so as to surround the respective steel wire ropes W, and one excitation unit 11 is provided for the plurality of steel wire ropes W. With this, a magnetic field can be applied to the plurality of steel wire ropes W respectively surrounded by the detection coils 10 by one excitation unit 11. As a result, since each detection coil 10 can be arranged in each of the regions through which the steel wire ropes W pass in the magnetic body inspection device 100, it is possible to suppress an increase in size of the device as compared with a configuration in which each detection coil 10 does not surround the periphery of the steel wire rope W.

Also, in the first embodiment, as described above, the excitation unit 11 is configured to surround the plurality of detection coils 10. With this, the plurality of detection coils 10 can be easily arranged inside the excitation unit 11. As a result, a magnetic field can be easily and reliably applied to the steel wire ropes W surrounded by the plurality of detection coils 10 by the magnetic field generated inside the excitation unit 11.

Also, in the first embodiment, as described above, the detection coil 10 includes a pair of differential coils 14, and the excitation unit 11 is configured to surround a plurality of sets of differential coils 14. As a result, even in cases where a plurality of sets of differential coils 14 is used, by applying a magnetic field by one excitation unit 11, it is possible to inspect the states (presence or absence of damage or the like) of the plurality of steel wire ropes W. As a result, since it is possible to apply a magnetic field to the differential coil 14 capable of suppressing the effect of the external magnetic field at a time by one excitation unit 11, it is possible to improve the accuracy of the inspection of the state (presence or absence of damage or the like) of the steel wire rope W and it is possible to simplify the configuration of the device.

In the first embodiment, as described above, the device further includes the determination unit 2 for determining the state of each steel wire rope W based on the plurality of detection signals output by the detection signal output unit 12. The determination unit 2 is configured to output, for each steel wire rope W, a threshold signal (first threshold Th1 and second threshold Th2) indicating that each detection signal output by the output unit 12 has exceeded when the detection signal output by the output unit 12 has exceeded the predetermined threshold signal (first threshold Th1 and second threshold Th2). With this, it is possible to easily determine the portion (position) where damage or the like occurred in the steel wire rope W.

Further, in the first embodiment, as described above, the excitation unit 11 includes the excitation coil 13 wound so as to surround the plurality of detection coils 10. The excitation coil 13 is configured so as to apply a magnetic field in a direction (Z-direction) in which the steel wire rope W extends. The plurality of detection coils 10 is configured so as to detect a change in the magnetic field of each of the steel wire ropes W caused by the application of the magnetic field by the excitation coil 13. As a result, the excitation coil 13 excites the magnetized states of the portion of the damage or the like of the steel wire rope W, so that the change in the magnetic field can be easily detected from the portion of the damage or the like of the steel wire rope W. In particular, in cases where an alternating current or the like is caused to flow through the excitation coil 13, the magnetic field of the steel wire rope W also changes with time. Therefore, the magnetic field to be detected by the detection coil 10 can be changed and detected without relatively moving the steel wire rope W and the detection coil 10.

Second Embodiment

Next, referring to FIG. 2 and FIG. 8, the configuration of the magnetic body inspection device 200 (see FIG. 2) according to the second embodiment will be described. The magnetic body inspection device 200 according to the second embodiment is different from the first embodiment in that the detection coils 10 are arranged so that at least the positions of the adjacent detection coils 10 are mutually shifted in the Z-direction.

Figure 8:
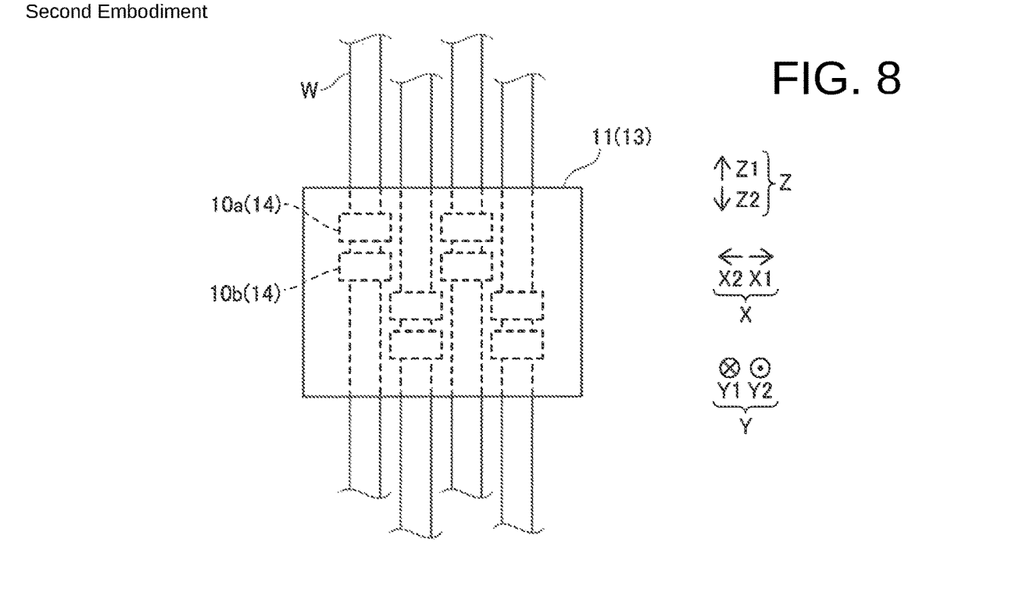
FIG. 8 is a schematic view of a magnetic body inspection device according to a second embodiment as viewed from the Y-direction.

Specifically, as shown in FIG. 8, the plurality of detection coils 10 is arranged so that at least the positions of the adjacent detection coils 10 are mutually shifted in the direction (Z-direction) in which the plurality of steel wire ropes W extend, and the excitation unit 11 (excitation coil 13) is configured to surround the plurality of detection coils 10 arranged in a shifted manner. Further, the plurality of detection coils 10 is arranged such that at least the adjacent detection coils 10 overlap each other in the Z-direction. Since the plurality of detection coils 10 is arranged so as to overlap in the Z-direction, the size of the excitation unit 11 (excitation coil 13) in the X-direction can be reduced, which in turn can reduce the size of detection unit 1 in the X-direction.

The rest of the configuration of the second embodiment is the same as that of the first embodiment.

Effects of Second Embodiment

In the second embodiment, as described above, the plurality of detection coils 10 is arranged such that at least the positions of the adjacent detection coils 10 are shifted from each other in the direction (Z-direction) in which the plurality of steel wire ropes W extend, and the excitation unit 11 is configured to surround the plurality of detection coils 10 arranged so as to be shifted from each other. As a result, even in cases where the intervals P of the plurality of steel wire ropes W are small, by arranging the plurality of detection coils 10 in a shifted manner in the direction (Z-direction) in which the steel wire ropes W extend, it is possible to arrange the detection coils 10 so as to overlap each other in the direction (Z-direction) in which the steel wire ropes W extend. As a result, as compared with the case in which the plurality of detection coils 10 is not arranged in a shifted manner in the direction (Z-direction) in which the steel wire ropes W extend, even in cases where the interval P between the plurality of steel wire ropes W is small, it is possible to perform an inspection using the magnetic body inspection device 200, so that the applicable range of the magnetic body inspection device 200 can be extended.

The other effects of the second embodiment are the same as those of the first embodiment.

Modifications

It should be understood that the embodiments disclosed here are examples in all respects and are not restrictive. The scope of the present invention is indicated by the appended claims rather than by the above-described descriptions of the embodiments and includes all modifications within the meanings and ranges equivalent to the scope of claims.

For example, in the above-described first and second embodiments, an example is shown in which the magnetic body is a long size member, but the present invention is not limited thereto. For example, the magnetic body may be, for example, a sheet other than a long size member or an iron ball (bearing). Alternatively, the present invention can be used to inspect an entire magnetic body having a uniform structure.

In the above-described first and second embodiments, an example is shown in which the magnetic body formed of a long size member is a steel wire rope W, but the present invention is not limited to this. For example, the magnetic body formed of a long size member may be a thin plate, a square member, a cylindrical pipe, a wire, a chain, or the like.

In the above-described first and second embodiments, a configuration in which an alternating current is caused to flow through the excitation interface 21 (excitation unit 11 (excitation coil 13) has been described, but the present invention is not limited to this configuration. For example, the determination unit 2 may be configured to cause a time-invariant (constant) direct current to flow through the excitation unit 11 (excitation coil 13) by the excitation interface 21. As a result, a static magnetic field having a constant magnitude in the Z-direction is generated in the excitation unit 11 (excitation coil 13). Even with such a configuration, it is possible to detect the change in the magnetic field of the steel wire rope W in the Z-direction at the detection position of the detection unit 1 by relatively moving the steel wire rope W with respect to the detection unit 1 at a constant velocity substantially constant in the Z-direction.

As a result, at the time of the inspection, as the position of the steel wire rope W to be detected by the detection coil 10 of the detection unit 1 changes with time, the magnetic field to be detected by the detection coil 10 also changes with time. When the detection coil 10 passes through a portion of the steel wire rope W having no damage or the like, the size of the magnetic field in the detection coil 10 in the Z-direction is substantially constant, and thus the detection signal is also constant. On the other hand, when the detection coil 10 is positioned at a position of the steel wire rope W having damage or the like, the detection signal changes because the magnitude of the magnetic field at the detection position changes with time. This makes it possible to determine the state (presence or absence of damage or the like) of the steel wire rope W.

Figure 9:
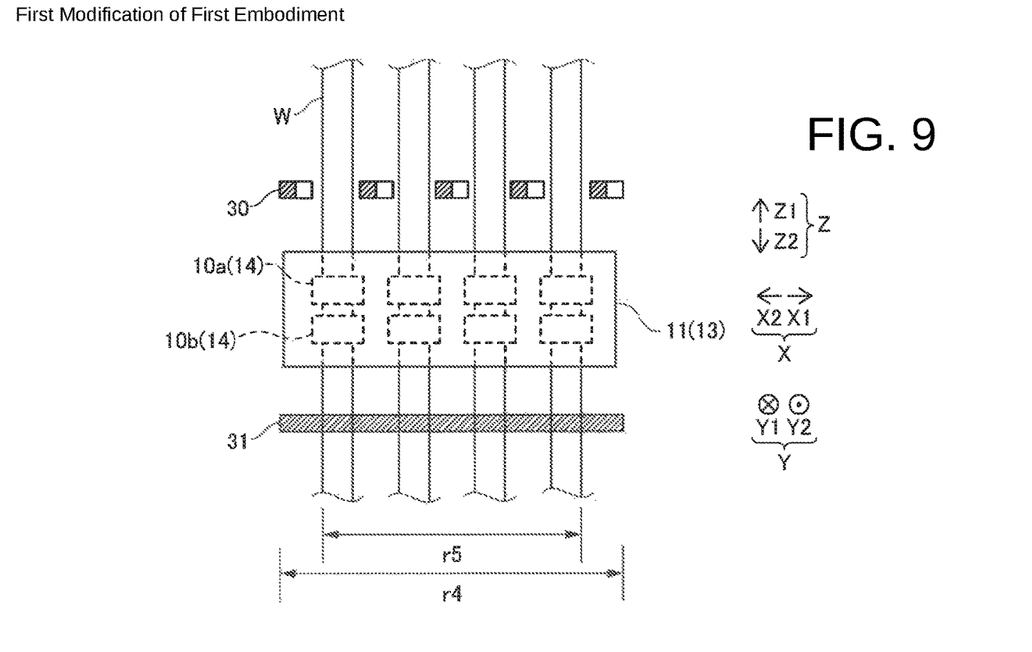
FIG. 9 is a schematic view of a magnetic body inspection device according to a first modification of the first embodiment as viewed from the Y-direction.

Further, in the above-described first and second embodiments, an example of the configuration was shown in which the steel wire rope W is excited by the excitation unit 11 (excitation coil 13) and the magnetic field of the steel wire rope W is detected by the detection unit 1, but the present invention is not limited thereto. For example, as shown in FIG. 9, the device may further include a magnetic field application unit 30 for applying a magnetic field to the steel wire rope W so that the magnetic field is applied in a predetermined direction to the steel wire rope W at a position spaced apart from each other in the direction (Z-direction) in which the steel wire rope W extends from the detection unit 1, and the plurality of detection coils 10 may be configured to detect the change in the magnetic field of the steel wire rope W in which the magnetic field is previously applied by the magnetic field application unit 30. Specifically, the magnetic field application unit 30 is positioned at a position spaced from the excitation unit 11

(excitation coil 13) in the Z-direction so that the excitation unit 11 (excitation coil 13) can apply a magnetic field to the steel wire rope W prior to applying a magnetic field to the steel wire rope W. Note that the magnetic field application unit 30 has a plurality of magnets arranged in the X-direction, and is configured to apply a magnetic field in the X-direction to a plurality of steel wire ropes W.

With this configuration, since a magnetic field is applied to the steel wire rope W in advance, the direction of the magnetization of the steel wire rope W can be made substantially constant. As a result, noises of the detection signal output from the detection signal output unit 12 can be reduced, which in turn can improve the S/N ratio of the detection signal. Therefore, by improving the S/N ratio of the detection signal, it is possible to more accurately inspect the states (presence or absence of damage or the like) of the plurality of steel wire ropes W. Note that as the magnetic field application unit, like the magnetic field application unit 31 shown in FIG. 9, it may be configured such that one magnet is provided for a plurality of steel wire ropes W. The magnetic field application unit 31 includes a magnet whose length r4 between the N and S poles in the X-direction is greater than the distance r5 in the X-direction in which the plurality of steel wire ropes W is arranged. The magnetic field application unit 31 is arranged such that the N pole and the S pole are opposed in the Y-direction with the plurality of steel wire rope W arranged therebetween. Therefore, the magnetic field application unit 31 can apply a magnetic field to the plurality of steel wire ropes W in the Y-direction.

Figure 10:
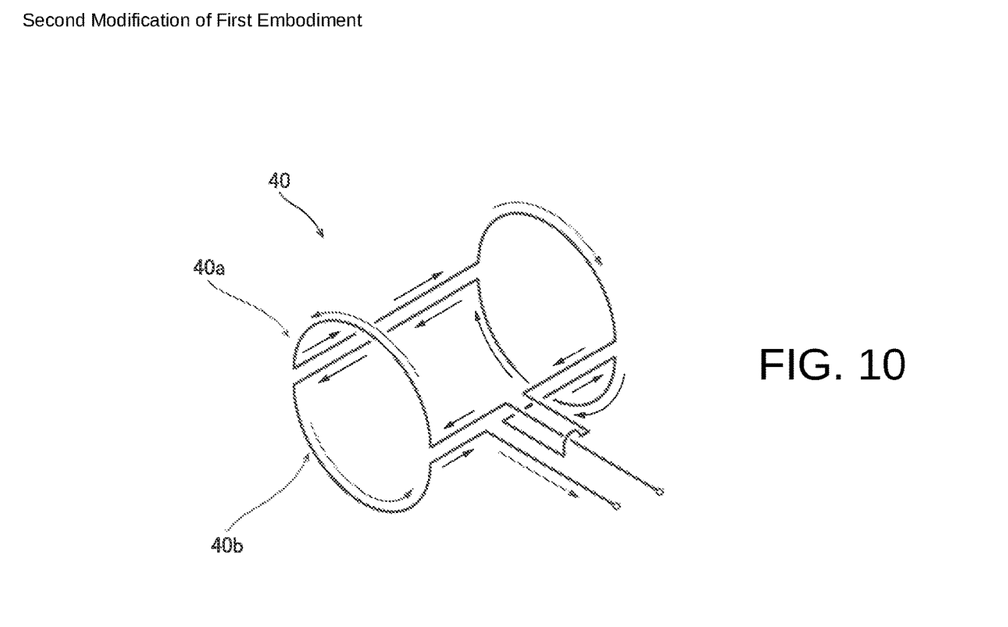
FIG. 10 is a schematic diagram of a detection coil according to a second modification of the first embodiment.
Figure 11:
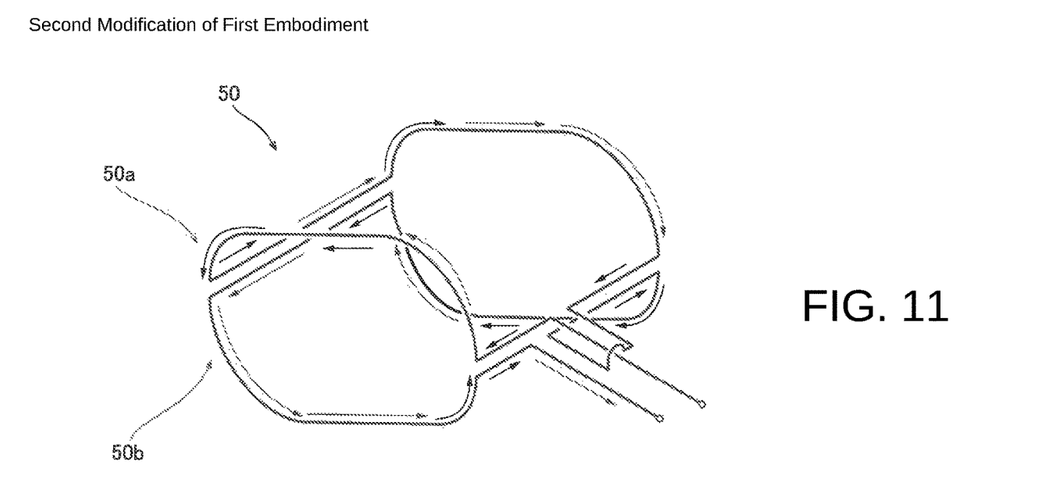
FIG. 11 is a schematic diagram of an excitation coil according to the second modification of the first embodiment.
Figure 12:
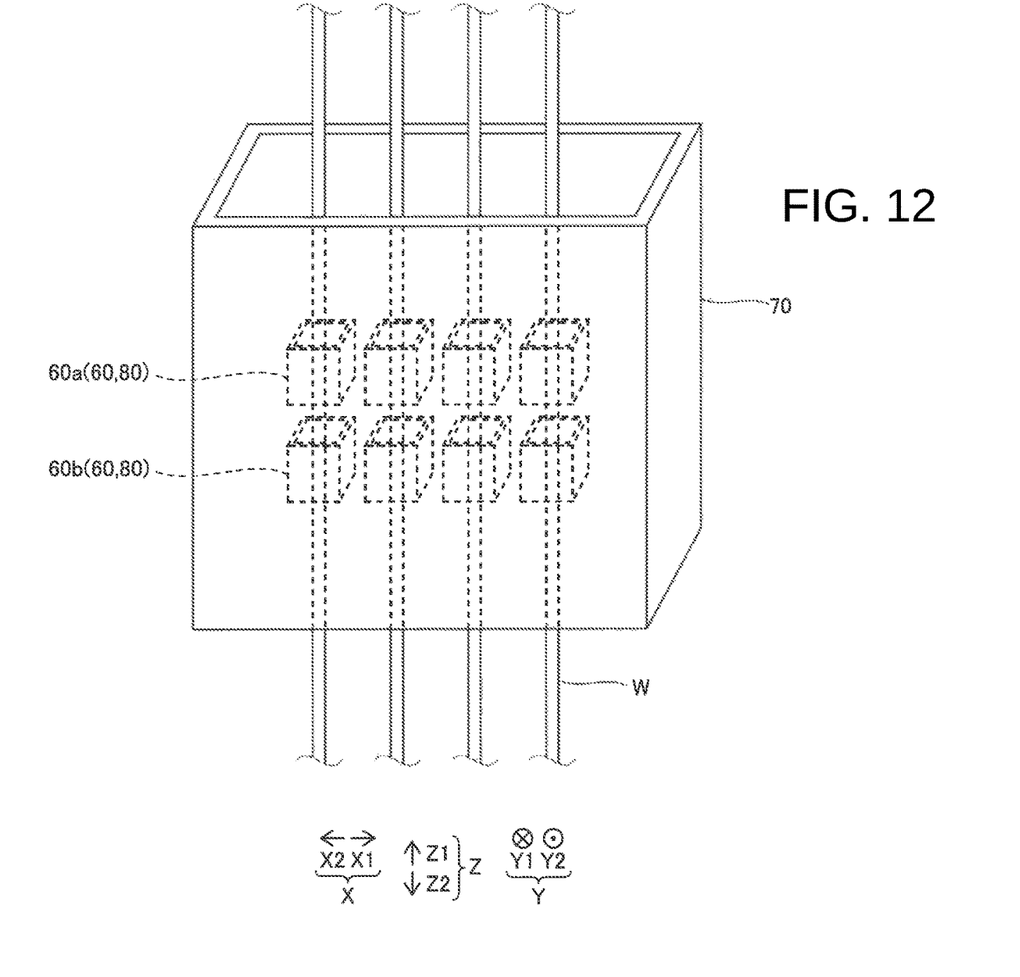
FIG. 12 is a schematic diagram of a detection coil and an excitation coil according to a third modification of the first embodiment.

In the above-described first and second embodiments, an example is shown in which a cylindrical coil (detection coil 10 and excitation unit 11 (excitation coil 13)) is provided so as to surround the steel wire rope W, but the present invention is not limited thereto. For example, as shown in FIG. 10, the detection coil 10 may be a cylindrical coil 40 configured by combing a semi-cylindrical (horseshoe-shaped) coil portion 40a and a semi-cylindrical (horseshoe-shaped) coil portion 40b. Further, as shown in FIG. 11, the excitation unit 11 (excitation coil 13) may be an elliptic cylindrical coil 50 configured by combining a coil portion 50a and a coil portion 50b having a semielliptical cylindrical shape (horseshoe-shape). The semi-cylindrical (horseshoe-shaped) and semi-elliptical cylindrical (horseshoe-shaped) coil can be easily attached and detached even in a state in which the steel wire rope W is installed (the end is closed). As shown in FIG. 12, the detection coil 10 and the excitation coil 13 may be configured by a rectangular cylindrical detection coil 60 and excitation coil 70. Alternatively, the differential coil 14 may be a differential coil 80 having a rectangular cylindrical detection coil 60a and detection coil 60b.

In the above-described first and second embodiments, an example is shown in which the determination unit 2 is configured to output a signal to the outside when the detection signal output by the detection coil 10 (detection unit 1) has exceeded a predetermined threshold Th (first threshold Th1 and second threshold Th2), but the present invention is not limited thereto. For example, it may be configured such that the determination unit 2 counts the number N of times that the detection signal has exceeded the threshold Th, and when the counted number N has exceeded the predetermined number M, to output a signal indicating that the counted number N has exceeded the predetermined number M to the outside. With this, the determination unit 2 counts the number of times N exceeding the threshold Th, and can determine the state of the deterioration of the steel wire rope W based on the amount of the damage or the like.

In addition, it may be configured such that the determination unit 2 determines the temporal change (for example, the progression rate of deterioration) in the presence/absence state of damage or the like of the steel wire rope W by comparing the number of times N exceeded the threshold Th in the previous measurement with the number of times N exceeded the threshold Th in the current measurement. The number of the predetermined threshold Th may be one or more than two (e.g., three).

In the above-described first and second embodiments, a configuration example is shown in which the magnetic body inspection device 100 (200) inspects the states (presence or absence of damage or the like) of four steel wire ropes W is shown, but the present invention is not limited to this. The number of the magnetic bodies inspected by the magnetic body inspection device 100 (200) may be any number.

In the above-described first and second embodiments, a configuration example is shown in which one excitation unit 11 (excitation coil 13) surrounds four detection coils 10 (four steel wire ropes W), but the present invention is not limited to this configuration. It is enough that the excitation unit 11 (excitation coil 13) is configured to surround two or more detection coils 10 (magnetic bodies). However, as the number of the excitation units 11 increases, the number of components increases and the size of the device increases, so that a configuration in which all the detection coils 10 provided in the magnetic body inspection device 100 (200) is surrounded by one excitation unit 11 (excitation coil 13) is preferable.

In the above-described first and second embodiments, an example is shown in which the magnetic body inspection device 100 (200) is used for inspecting a plurality of steel wire ropes W mounted in the elevator 400, but the present invention is not limited thereto. The magnetic body inspection device 100 (200) can also be applied to wire-based devices and infrastructures, such as, e.g., mobile devices such as a ropeway, and multiple wire sections such as suspension bridges and piers. Furthermore, it is applicable to any application for measuring the loss damage of a plurality of magnetic bodies, such as not only wires but also water and sewage pipes, gas pipes, pipelines, and the like.

In the above-described first and second embodiments, a configuration example is shown in which the determination unit 2 outputs a detection signal or the like to an external personal computer or the like via the digital output interface 22, but the present invention is not limited thereto. For example, the determination unit 2 may further include a notification unit for notifying a determination result such as a detection signal. With this configuration, the determination result can be notified to the operator who operates the magnetic body inspection device 100 (200). As a result, the operator can recognize the determination result without using a device other than the magnetic body inspection device 100 (200). The determination unit 2 may further include a communication unit for transmitting a detection signal or a signal based on the detection signal to the external device. With this configuration, a detection signal or a signal (for example, a determination result signal) based on the detection signal acquired by the detection unit 1 can be transmitted to an external device. Consequently, the operator can perform the analysis or the like of the signal based on the signal based on the detection signal or the signal based on the detection signal by the external device.

Further, in the above-described first and second embodiments, damage of the magnetic body surface was mainly described as the "damage and the like" of the magnetic body as a detection target, braking of wire (braking of element wires in the case of a wire rope), changes in thickness, corrosion (rust), cracking, non-uniformity of permeability are also included in the detection object. The detection target is not limited to a surface of a magnetic body, and may be an inner surface thereof. In addition, as long as it is in a state of causing a magnetic field of a magnetic body or a non-uniformity of a magnetic field of a magnetic body, it is possible to detect as a the "state of a magnetic body".

Further note that the "change in the magnetic field of the magnetic body" includes not only a change in the magnetic field observed in the vicinity of the magnetic body to which a magnetic field is applied when a magnetic field is applied from the outside, but also a change in the magnetic field caused by the magnetic body itself when a magnetic field is not applied from the outside.

DESCRIPTION OF SYMBOLS 10, 60: Detection coil
11, 70: Excitation unit
12: Detection signal output unit
13: Excitation coil
14, 80: Differential coil
30: Magnetic field application unit
40: Cylindrical coil (detection coil)
50: Elliptic cylindrical coil (excitation unit, excitation coil)
100, 200: Magnetic body inspection device
Th: Predetermined threshold
Th1: Predetermined first threshold
Th2: Predetermined second threshold
Z-direction: Extension direction of a long size member
W: Steel wire rope (magnetic body, long size member)

The invention claimed is:

1. A magnetic body inspection device for inspecting states of a plurality of magnetic bodies by a total magnetic flux method for measuring a magnetic flux inside a magnetic body, the magnetic body inspection device comprising:
a plurality of detection coils each configured to detect a magnetic field of a respective magnetic body of the plurality of magnetic bodies;
one excitation unit including an excitation coil configured to apply a magnetic field to each of the plurality of magnetic bodies, and provided for the plurality of magnetic bodies;
a detection signal output circuit configured to output a detection signal based on the magnetic field of each of the magnetic bodies, and
a magnetic field applicator configured to apply a magnetic field to the magnetic body so that the magnetic field is applied to the magnetic body in a predetermined direction,
wherein the plurality of detection coils are respectively wound around the plurality of magnetic bodies in a direction in which the respective magnetic body extends, and are configured to detect a change in the magnetic field of the magnetic body to which the magnetic field has been previously applied by the magnetic field applicator by the total magnetic flux method for measuring the magnetic flux inside the magnetic body, and
wherein the change in the magnetic field of each magnetic body is caused by the application of the magnetic field by the excitation coil.

2. The magnetic body inspection device as recited in claim 1,
wherein each of the plurality of detection coils provided so as to surround a periphery of a respective magnetic body of the plurality of magnetic bodies.

3. The magnetic body inspection device as recited in claim 1,
wherein the excitation coil surrounds the plurality of detection coils.

4. The magnetic body inspection device as recited in claim 3,
wherein each detection coil includes a pair of differential coils, and
wherein the excitation coil surrounds a plurality of sets of the differential coils.

5. The magnetic body inspection device as recited in claim 1,
wherein each magnetic body is a long size member,
wherein the plurality of detection coils are arranged such that positions of at least the detection coils arranged adjacently are shifted from each other in a direction in which the plurality of long size members extends, and
wherein the excitation coil surrounds the plurality of detection coils arranged to be shifted from each other.

6. The magnetic body inspection device as recited in claim 1, further comprising:
a processor configured to determine a status of each of the plurality of magnetic bodies based on a plurality of the detection signals output by the detection signal output circuit,
wherein the processor is configured to output a threshold signal indicating that each of the detection signals has exceeded a predetermined threshold for a respective magnetic body when each of the detection signals output by the detection signal output circuit has exceeded the predetermined threshold.

7. The magnetic body inspection device as recited in claim 1,
wherein the excitation coil is arranged so as to wind around the plurality of detection coils and
is configured to apply a magnetic field in a direction in which each magnetic body extends, and
wherein each of the plurality of detection coils is configured to detect a change in the magnetic field of a respective magnetic body of the magnetic bodies caused by an application of the magnetic field by the excitation coil.

* * * * *